(12) United States Patent
El-Bakry

(10) Patent No.: US 8,661,902 B2
(45) Date of Patent: Mar. 4, 2014

(54) METHOD, APPARATUS AND SOFTWARE FOR DETECTING YIELD IN A MECHANICAL STRUCTURE BY MEANS OF ACOUSTIC EMISSION DATA FROM SAID STRUCTURE

(75) Inventor: Murad El-Bakry, Bristol (GB)

(73) Assignee: Airbus Operations Limited, Bristol (GB)

( * ) Notice: Subject to any disclaimer, the term of this patent is extended or adjusted under 35 U.S.C. 154(b) by 37 days.

(21) Appl. No.: 13/138,685

(22) PCT Filed: Mar. 31, 2010

(86) PCT No.: PCT/GB2010/050553
§ 371 (c)(1),
(2), (4) Date: Sep. 19, 2011

(87) PCT Pub. No.: WO2010/116169
PCT Pub. Date: Oct. 14, 2010

(65) Prior Publication Data
US 2012/0017124 A1    Jan. 19, 2012

(30) Foreign Application Priority Data

Apr. 6, 2009  (GB) .................................. 0905885.0

(51) Int. Cl.
*G01N 29/14*  (2006.01)

(52) U.S. Cl.
USPC ............................................. 73/587; 73/801

(58) Field of Classification Search
USPC .................. 73/587, 579, 583, 584, 594, 801
See application file for complete search history.

(56) References Cited

U.S. PATENT DOCUMENTS

| | | | | |
|---|---|---|---|---|
| 3,956,731 A * | 5/1976 | Lewis, Jr. | | 340/945 |
| 4,215,633 A | 8/1980 | Anderson et al. | | |
| 4,408,160 A | 10/1983 | King et al. | | |
| 4,448,062 A | 5/1984 | Peterson et al. | | |
| 4,901,575 A | 2/1990 | Bohannan et al. | | |
| 5,115,681 A * | 5/1992 | Bouheraoua et al. | | 73/801 |
| 5,255,565 A * | 10/1993 | Judd et al. | | 73/579 |
| 5,814,729 A * | 9/1998 | Wu et al. | | 73/588 |
| 6,006,163 A * | 12/1999 | Lichtenwalner et al. | | 702/36 |
| 7,623,974 B2 * | 11/2009 | Cipra | | 702/41 |
| 7,930,112 B2 * | 4/2011 | Mattes | | 702/36 |
| 8,060,319 B2 * | 11/2011 | Stothers et al. | | 702/39 |
| 2007/0095138 A1 | 5/2007 | El-Bakry et al. | | |
| 2012/0006118 A1 * | 1/2012 | Stothers et al. | | 73/587 |

FOREIGN PATENT DOCUMENTS

| | | |
|---|---|---|
| DE | 199 04 426 | 8/2000 |
| GB | 743267 | 1/1956 |
| JP | 62 196418 | 8/1987 |
| SU | 894 433 | 12/1981 |
| WO | WO 2006/117431 | 11/2006 |

OTHER PUBLICATIONS

International Search Report for PCT/GB2010/050553, mailed Aug. 17, 2010.
Written Opinion for PCT/GB2010/050553, mailed Aug. 17, 2010.
European examination Communication dated Nov. 22, 2012 in EP 10 713 237.5-1236.
M.R. Bhat et al, "Fatigue damage stages in unidirectional glass-fibre-epoxy composites: identification through acoustic emission technique" *Int. J Fatigue*, Sep. 1993, pp. 401-405.
M.A. Majeed et al, "On using peak amplitude and rise time for AE source characterization" *Sadhana*, vol. 27, Part 3, Jun. 2002, pp. 295-307.

* cited by examiner

*Primary Examiner* — J M Saint Surin
(74) *Attorney, Agent, or Firm* — Nixon & Vanderhye P.C.

(57) ABSTRACT

A method, apparatus and software is disclosed for using parameters of acoustic emissions emitted from an structure, such as aircraft landing gear, for detecting yield in the structure.

22 Claims, 8 Drawing Sheets

| Material Yield Signature ||
|---|---|
| Material | Steel - 300M - AMS6419 |
| Dimensions | 6x80x350mm |
| Strain Test | Static 195kN |
| Parameter | AE Pulse Rise Time |
| Range | 3400µs to 3800µs |

METHOD, APPARATUS AND SOFTWARE FOR DETECTING YIELD IN A MECHANICAL STRUCTURE BY MEANS OF ACOUSTIC EMISSION DATA FROM SAID STRUCTURE

This application is the U.S. national phase of International Application No. PCT/GB2010/050553 filed 31 Mar. 2010 which designated the U.S. and claims priority to GB Patent Application No. 0905885.0 filed 6 Apr. 2009, the entire contents of each of which are hereby incorporated by reference.

FIELD OF INVENTION

The present invention relates to a method, apparatus or software for detecting yield in a mechanical structure by means of acoustic emission data from said structure.

BACKGROUND OF THE INVENTION

Yield occurs in a structure when the structure is stressed beyond its elastic limit and results in permanent deformation of the structure. In some structures, yield in a component may occur without degradation of function or failure of the structure or component. In performance or safety critical systems, such as aircraft, the presence of yield in particular structures may need to be immediately detected to enable proper assessment for repair or replacement of the affected structure. However, detecting the presence of deformations resulting from yield is a complex process. For example, the structure may still function normally and any resulting deformation may be very small and thus difficult to measure.

SUMMARY OF THE INVENTION

An embodiment of the invention provides a method for detecting yield in a mechanical structure by means of acoustic emission data from the structure, the method comprising the step of:
a) selecting a parameter for data representing an acoustic emission;
b) determining a range of reference parameter values for the selected parameter, the reference parameter values being indicative of an acoustic emission coincident with mechanical yield in a reference structure;
c) receiving data representing one or more acoustic emissions detected in an operational structure;
d) extracting operational parameter values for the selected parameter from the or each detected acoustic emission;
e) determining whether each operational parameter value is within the range of reference parameter values for the or each detected acoustic emission;
f) if one or more of the operational parameter values is within the range of reference parameter values then signalling that yield has been detected in the operational structure.

A plurality of the parameters may be selected for data representing each acoustic emission and respective reference parameter ranges determined for the reference structure. Operational parameter values may be extracted for each selected parameter and if one or more of the operational parameter values is within the range of the corresponding reference parameter values then signalling that yield has been detected in the operational structure. The signalling may be performed only when a predetermined threshold number of the operational parameter values are within the range of the corresponding reference parameter values. The signalling may be performed only when all of the operational parameter values are within the range of the corresponding reference parameter values. The or each parameter may comprise acoustic emission pulse rise time or pulse amplitude or pulse duration. The or each parameter may be selected in dependence on the material from which the operational structure is formed.

Another embodiment provides a method for selecting the or each parameter and determining the corresponding range of reference parameter values for use in the method above, the method comprising the steps of:
g) performing a yield test on the reference structure;
h) identifying a yield period for the reference structure;
i) detecting acoustic emissions emitted from the reference structure during the yield test;
j) comparing the values of a selected set of reference parameters of the acoustic emissions detected in the yield period to the acoustic emission received outside of the yield period;
k) identifying the reference parameters having a significant variance between the yield period and outside the yield period; and
l) selecting any such identified reference parameter and determining the range of reference parameter values, as indicative of an acoustic emission coincident with mechanical yield in a reference structure, based on the respective identified variance.

The operational structure may be substantially formed from the same material as the reference structure. The acoustic emissions may be received from an acoustic emissions monitoring system. The signalling that yield has been detected may be provided to a fault monitoring system for the operational structure. The operational structure may be a landing gear element in an aircraft.

Another embodiment provides apparatus for detecting yield in a mechanical structure by means of acoustic emission data from the structure, the apparatus being operable to:
select a parameter for data representing an acoustic emission;
determine a range of reference parameter values for the selected parameter, the reference parameter values being indicative of an acoustic emission coincident with mechanical yield in a reference structure;
receive data representing one or more acoustic emissions detected in an operational structure;
extract operational parameter values for the selected parameter from the or each detected acoustic emission;
determine whether each operational parameter value is within the range of reference parameter values for the or each detected acoustic emission;
if one or more of the operational parameter values is within the range of reference parameter values then signal that yield has been detected in the operational structure.

A further embodiment provides a computer program product loadable into the internal memory of a digital computer, comprising software code portions for performing, when the product is run on a computer, a method for detecting yield in a mechanical structure by means of acoustic emission data from the structure, the method comprising the step of:
a) selecting a parameter for data representing an acoustic emission;
b) determining a range of reference parameter values for the selected parameter, the reference parameter values being indicative of an acoustic emission coincident with mechanical yield in a reference structure;
c) receiving data representing one or more acoustic emissions detected in an operational structure;
d) extracting operational parameter values for the selected parameter from the or each detected acoustic emission;

e) determining whether each operational parameter value is within the range of reference parameter values for the or each detected acoustic emission;

f) if one or more of the operational parameter values is within the range of reference parameter values then signalling that yield has been detected in the operational structure.

Another embodiment provides a computer program product loadable into the internal memory of a digital computer, comprising software code portions for providing, when the product is run on a computer, apparatus for detecting yield in a mechanical structure by means of acoustic emission data from the structure, the apparatus being operable to:

select a parameter for data representing an acoustic emission;
determine a range of reference parameter values for the selected parameter, the reference parameter values being indicative of an acoustic emission coincident with mechanical yield in a reference structure;
receive data representing one or more acoustic emissions detected in an operational structure;
extract operational parameter values for the selected parameter from the or each detected acoustic emission;
determine whether each operational parameter value is within the range of reference parameter values for the or each detected acoustic emission;
if one or more of the operational parameter values is within the range of reference parameter values then signal that yield has been detected in the operational structure.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
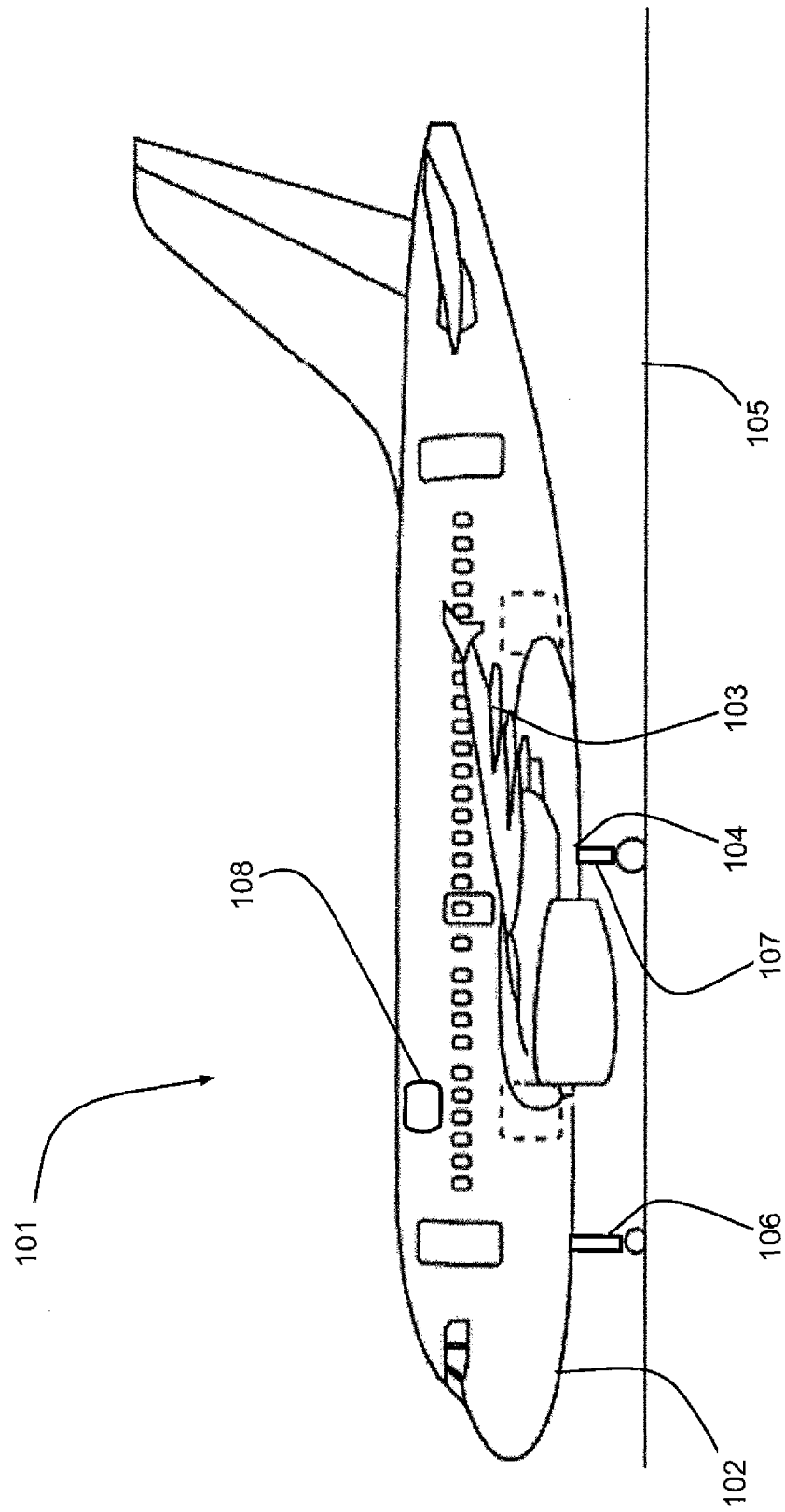
FIG. 1 is a side view of an aircraft on the ground.

With reference to FIG. 1, an aircraft 101 comprises a fuselage 102 and a set of wings 103 faired into the fuselage 102 via fairings 104. The aircraft 101 is supported on the ground 105 by a set of landing gear comprising nose gear 106 and main landing gear 107. The aircraft 101 further comprises an overload monitoring system (OMS) 108 arranged to detect overloading of selected elements of the structure of the aircraft 101. In the present embodiment, the OMS 108 is arranged to detect overloading of the landing gear 106, 107 and report this as a fault to the aircraft systems. Such overloading may result from a hard landing, off runway excursion or other abnormal event for the aircraft 101. Such overloading may necessitate replacement of the main landing gear 107.

Figure 2:
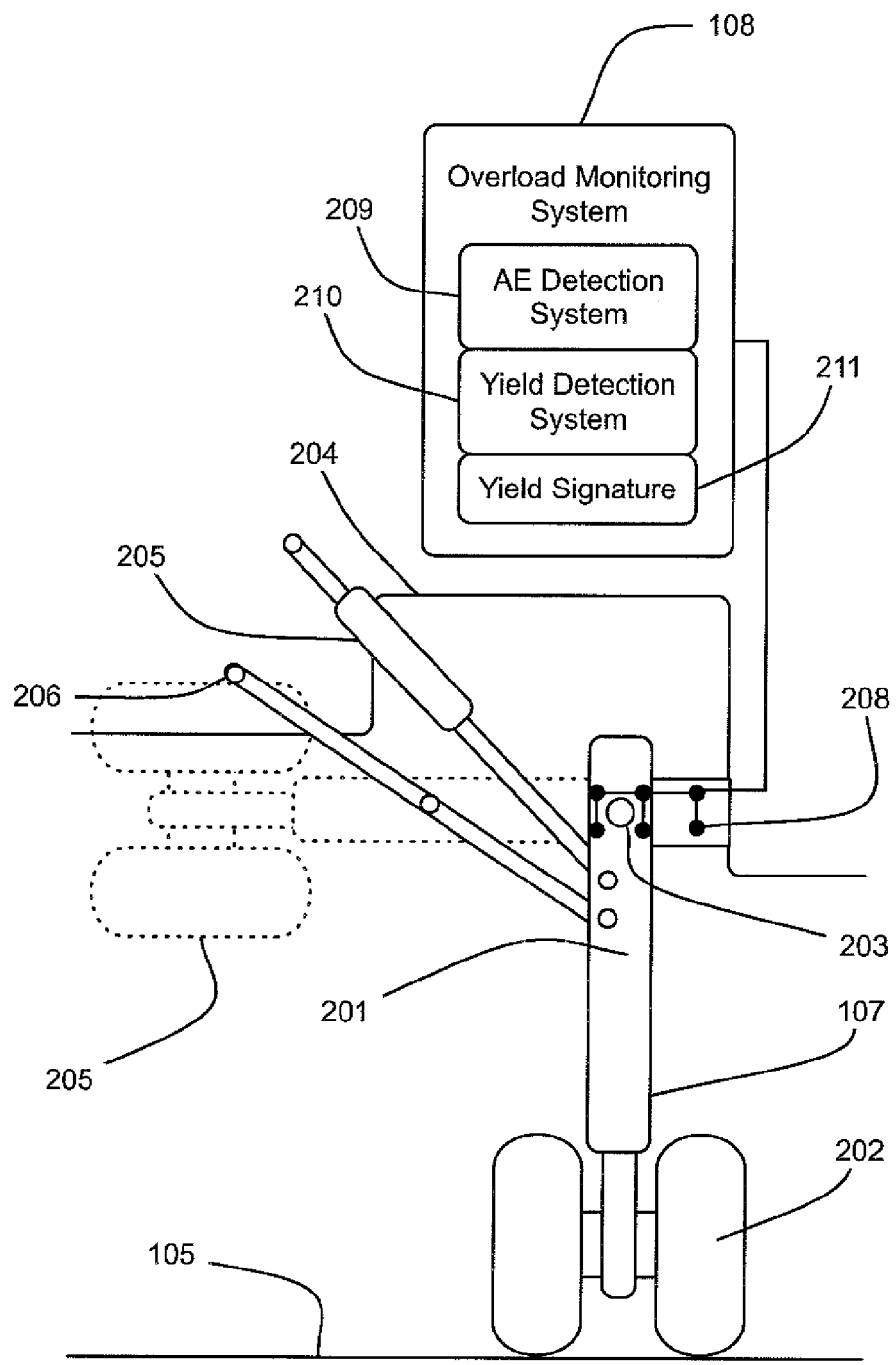
FIG. 2 is a front view of the landing gear of the aircraft of FIG. 1 including a yield detection system.

With reference to FIG. 2, the main landing gear 107 comprises a main strut 201 bearing a set of wheels 202 at one end and attached via a pivot pin 203 at the other end to a bulkhead 204 in the underside of the respective wing 103. The main landing gear 107 is arranged for movement between its deployed position, as shown in FIG. 2, and a retracted position 205. The main landing gear 107 is moved between the deployed and retracted position 205 by an actuator 206 operated by a control system (not shown) and supported in its deployed position by a lockable hinged strut 207. In the present embodiment, a set of acoustic emission (AE) sensors 208 are fixed to the main landing gear 107 around its point of attachment with the bulkhead 204. In the present embodiment, the AE sensors 208 are placed in the region of the strut 201 around the pivot pin that is most likely to undergo yield in response to an overload condition when the landing gear 107 is deployed. The sensors are connected to an acoustic emission (AE) monitoring system 209, which is a component of the overload monitoring system 108. In the present embodiment, the AE monitoring system 108 is the Balrue™ system provided by Ultra Electronics Ltd., UK and Airbus S.A.S. The AE monitoring system 209 is arranged to process the data from each of the sensors 208 so as to extract data representing each acoustic emission (AE) detected from the landing gear 107. The provision of three or more AE sensors 208 enables the AE monitoring system 209 to filter out AEs from the parts of the aircraft structure other than the area of interest, that is, the area where yield is most likely to occur. In the present embodiment, the AE monitoring system 209 uses triangulation to perform such filtering.

The AE data is fed, in real-time, to a yield detection system 210 for further processing and analysis. The yield detection system 210 is arranged to compare each set of AE data received to a predetermined yield signature 211. The yield signature 211 is a set of one or more attributes or parameter value ranges of an AE that are indicative of yield occurring in the relevant structure. In other words, if an AE that conforms to the relevant yield signature is detected from a structure, this indicates that the AE resulted from or was coincident with yield occurring in the structure. In the present embodiment, the yield signature 211 is determined by a set of tests performed on a test structure formed from the same material as the relevant operational structure, that is, the landing gear 107. The determination of the yield signature 211 is described in further detail below with reference to FIGS. 4 to 9.

Figure 3:
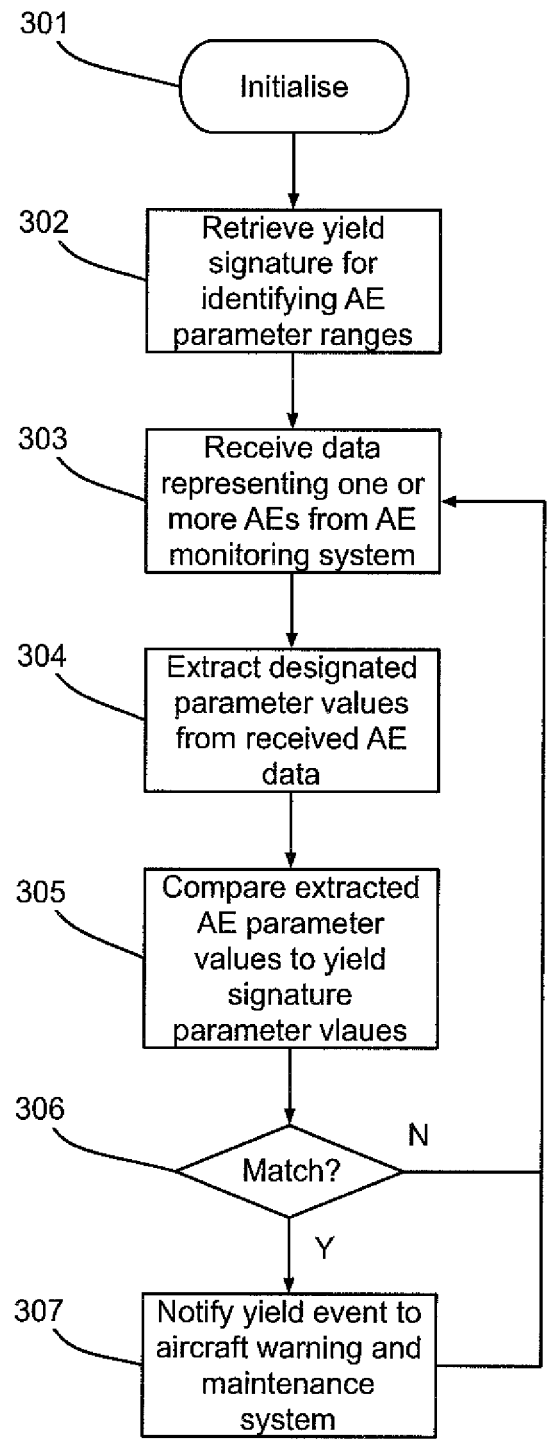
FIG. 3 is a flow chart illustrating processing performed by the yield detection system of FIG. 2.

The processing performed by the yield detection system 210 when analysing AE data received from the AE monitoring system 209 will now be described in further detail with reference to the flow chart of FIG. 3. At step 301, processing is initialised in response to the initialisation of the aircraft systems including the overload monitoring system 108 and processing moves to step 302. At step 302, the yield signature 211 is retrieved for the relevant structure, which identifies the AE parameters and their respective value ranges indicative of yield in the operational structure. Processing then moves to step 303 to await the receipt of AE data representing one or more AEs from the AE monitoring system 209. In response to the receipt of a set of AE data, processing moves to step 304. At step 304, the values for the relevant AE parameters are extracted from the received AE data and processing moves to step 305. At step 305, each extracted AE parameter value is compared to the corresponding AE parameter value range defined in the yield signature 211 to determine whether or not the extracted AE parameter values fall within the corresponding AE parameter value range. Processing then moves to step 306 from which, if each of the extracted AE parameter value falls within the corresponding AE parameter value range, thus indicating that yield has occurred in the operational structure, then processing moves top step 307. At step 307, the detected yield event in the operational structure is passed as a landing gear fault to the aircraft systems. If at step 306, not all of the extracted AE parameter values fall within the corresponding AE parameter value ranges then processing returns to step 303 and proceeds as described above.

Figure 4:
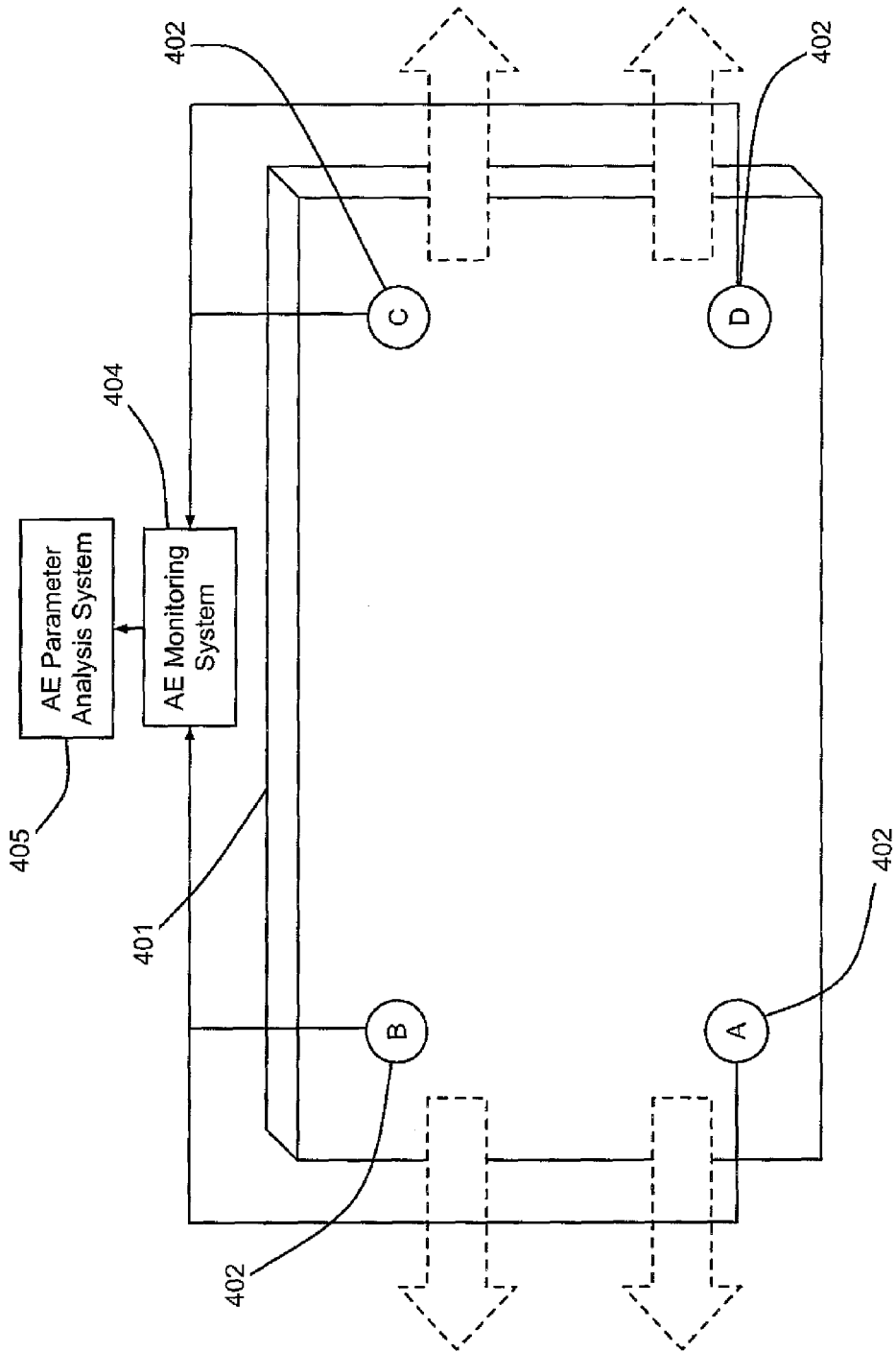
FIG. 4 is a schematic illustration of a reference structure undergoing a yield test for identifying acoustic emission data for use in the yield detection system of FIG. 2.

With reference to FIG. 4, in the present embodiment, in order to determine the yield signature 211, a reference structure 401 is subjected to a yield test. In other words, the reference structure is subjected to controlled tensile strain 402 using a test rig (not shown). The strain 402 on the reference structure 401 is increased linearly over time to a maximum strain and measured by a plurality of strain gauges in the test rig. A set of acoustic sensors 403 are fixed to the reference structure and connected to an AE monitoring system 404 equivalent to the system 105 described above. The AE monitoring system 404 is arranged to record data representing each AE detected during the strain test on the reference structure 401. The AE monitoring system 404 is connected to an AE parameter analysis system 405 arranged to input and analyze the AE data captured during a strain test for a given reference structure. The analysis performed by the AE parameter analysis system 405 enables a yield signature 211 to be derived for use with the operational structure corresponding to the reference structure 401 and is described in further detail below.

Figure 5:
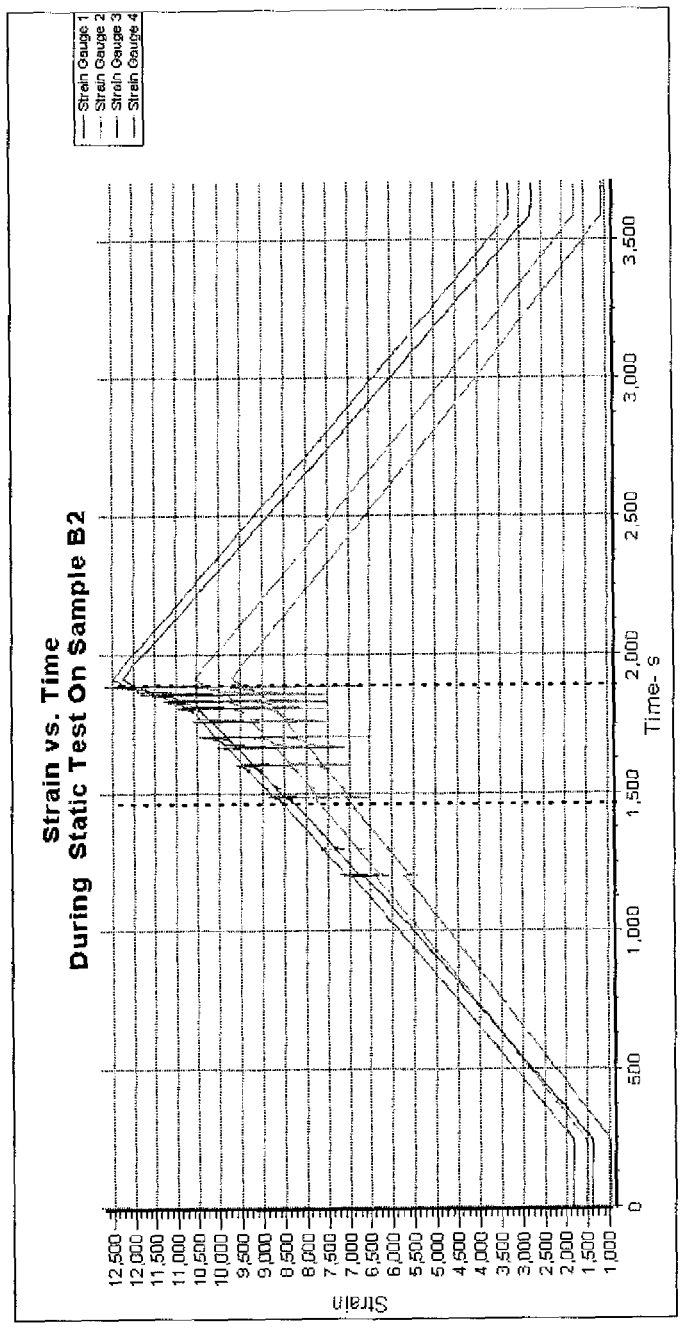
FIG. 5 is a graph showing parameters of an example acoustic emission produced by the reference structure in the yield test of FIG. 4.

FIG. 5 shows the output from each of the strain gauges over time for the duration of the yield test on the reference structure 401 described above. The spikes in each of the strain curves indicate slippage between the reference structure 401 and the clamps of the test rig. However, areas of non-linearity in the output of the strain gauges during the test indicate the occurrence of yield in the reference structure 401. In the graph of FIG. 5, the strain graphs become non-linear from 1482 s until 1807 s thereby indicating that yield occurred in the test structure over this period. Thus the AE parameter analysis system 405 is arranged to compare the data representing the AEs detected within the identified yield period with those detected outside the yield period.

Figure 6:
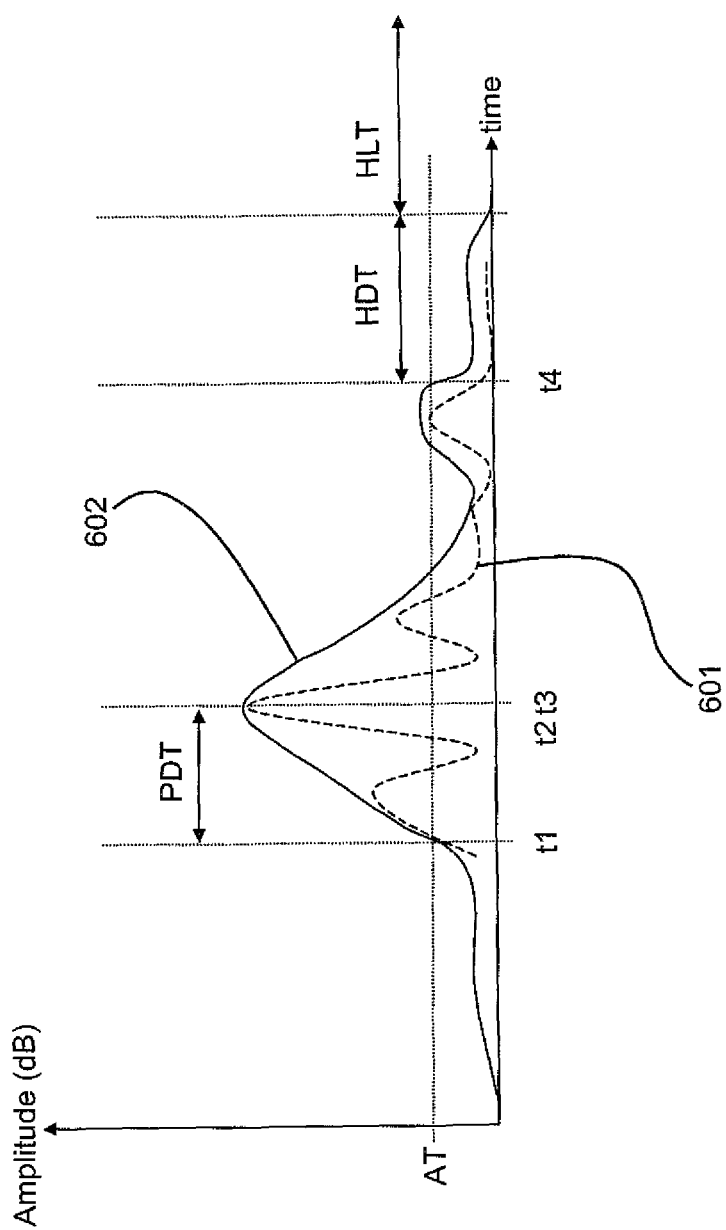
FIG. 6 is a graph showing strain against time in the yield test of FIG. 4.

With reference to FIG. 6, each acoustic emission 601 captured by the AE monitoring system comprises a pulse having an envelope 602 with a set of measurable parameters. Values for each of these parameters are extracted from the data representing a given AE provided to the AE parameter analysis system 405. In addition to the measurable parameters, a number of user-defined thresholds are also provided. These user-defined thresholds identify start or end points for one or more of the measurable parameters. For the present embodiment, the set of thresholds are set out in table 1 below and the set of parameters are set out in table 2 below:

TABLE 1

| User Defined Thresholds | Definition |
| --- | --- |
| Peak Detection time (PDT) | The time from threshold crossing to the peak of the signal. |

TABLE 1-continued

| User Defined Thresholds | Definition |
| --- | --- |
| Hit detection time (HDT) | The time that a signal would have to remain below the amplitude threshold to define what preceded it as a hit. |
| Hit Lockout Time (HLT) | This is a period invoked after a hit is detected. Within this time after a hit detection no new hits are allowed to be logged or detected. |
| Amplitude Threshold (AT) | The amplitude value in dB above which, received signals are considered to have been an emitted AE. |

TABLE 2

| Parameter | Definition |
| --- | --- |
| Hit | A single AE occurrence that fulfils the user input criteria, captured at one sensor. |
| Event | A combination of hits fulfilling speed of sound and time of flight conditions to enable position identification by triangulation techniques. |
| Amplitude | A maximum positive or negative scalar measure of the detected wave magnitude of oscillation, that is, the magnitude of the maximum disturbance in the medium during one wave cycle. Amplitude is expressed in dB using the relationship: dB = 20log(Vmax/1 microvolt)-(Pre-amplifier Gain in dB) Where V is volts and dB are decibels. For example if the preamplifier gain is 40 dB and the maximum voltage detected is 1 volt, the amplitude is 80 dB. |
| Absolute Energy | Derived from the integral of the squared voltage signal divided by the reference resistance over the duration of the AE waveform. |
| Counts | The number of AE signal threshold crossings during a single hit. For example, FIG. 4 shows four AE counts have been generated. |
| Burst Rise Time | The time between the first threshold crossing and the peak amplitude. |
| Average Signal Level (ASL) | The continuously varying and time averaged amplitude of the AE signal. ASL follows the amplitude and is measured in dB. |
| Counts to Peak | The number of threshold crossings that occur from the start of the hit and when the peak amplitude is reached (rise-time). FIG. 4 shows 2 counts to peak. |
| Burst Duration | The time required for the pulse to decay from the first threshold crossing to the last threshold crossing. |
| Average Frequency | A frequency with units in kHz derived from other collected AE features, that is, AE counts and Duration. Average Frequency = AE Counts/Duration |
| Reverberation Frequency | The frequency from peak amplitude to end of hit with units in kHz. Reverberation Frequency is derived from other collected AE features, namely AE counts, Counts to Peak, duration and rise time. Reverberation Frequency = (AE counts-counts to peak)/(duration-rise time) |
| Initiation Frequency | The frequency of the time domain signal from threshold crossing to peak amplitude, with units in kHz. Initiation Frequency is derived from other collected AE features, that is, AE counts to peak and rise time. Initiation Frequency = AE counts to peak/rise time |
| Frequency Centroid | A value weighted power spectrum. The sum of the product of the magnitude and frequency of each element in the Fast Fourier Transform (FFT) array is divided by the sum of the magnitudes. DC is excluded from the summation. May be referred to as the $2^{nd}$ moment of inertia. |
| Frequency - FFT of time-domain signal | The frequency domain equivalent of the received signal calculated in kHz. |

Figure 7:
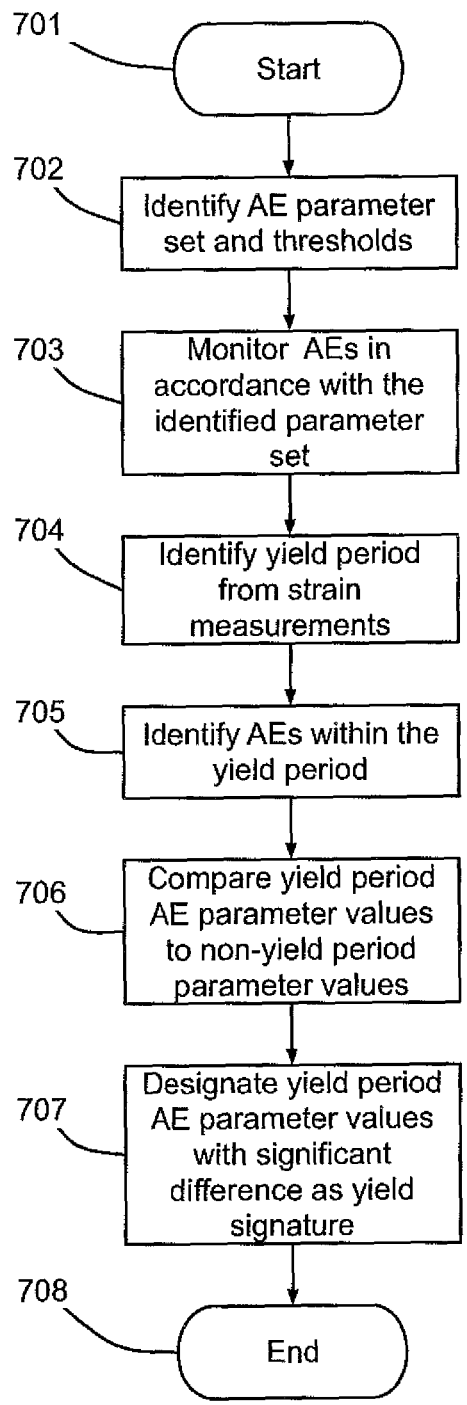
FIG. 7 is a flow chart illustrating the processing performed for selecting one or more parameters from the acoustic emission produced by the reference structure in the yield test of FIG. 4.

The processing performed by the AE parameter analysis system 405 when determining the yield signature 211 for a given reference structure 401 will now be described further with reference to FIG. 7. Processing is initiated at step 701 in response to the initialization of the processing of the AE monitoring system 404 and processing moves to step 702. At step 702, a set of parameters and relevant thresholds are identified for analysis of received AE data and processing moves to step 703. At step 703 the data representing the AEs produced during the strain test and detected by the AE monitoring system 404 is received and the values for each of the selected parameters are extracted and stored and processing moves to step 704. At step 704, the strain measurements for the test are received and analyzed to determine the yield period. As noted above, the yield period is identified as the period for which the strain measurements for the reference structure are non-linear with respect to time. Processing then moves to step 705 where each of the received AE emitted within the yield period is identified and processing moves to step 706. At step 706, the extracted parameter values for the AEs emitted outside the yield period are compared with those for AEs emitted within the yield period so as to identify the set of parameter values of an AE that indicate that it was emitted in the yield period. In other words, the set of parameter values are identified that vary significantly for AEs emitted in the yield period. The detection of an AE with such parameter values is thus indicative of yield having occurred in the reference structure and thus also indicative of yield in the corresponding operational structure. Processing then moves to step 707 where the set of parameter values identified as significantly different for AEs emitted in the yield period are designated as the yield signature 211 for the reference structure and its corresponding operational structure. Processing then moves to step 708 and ends.

Figures 8, 9:
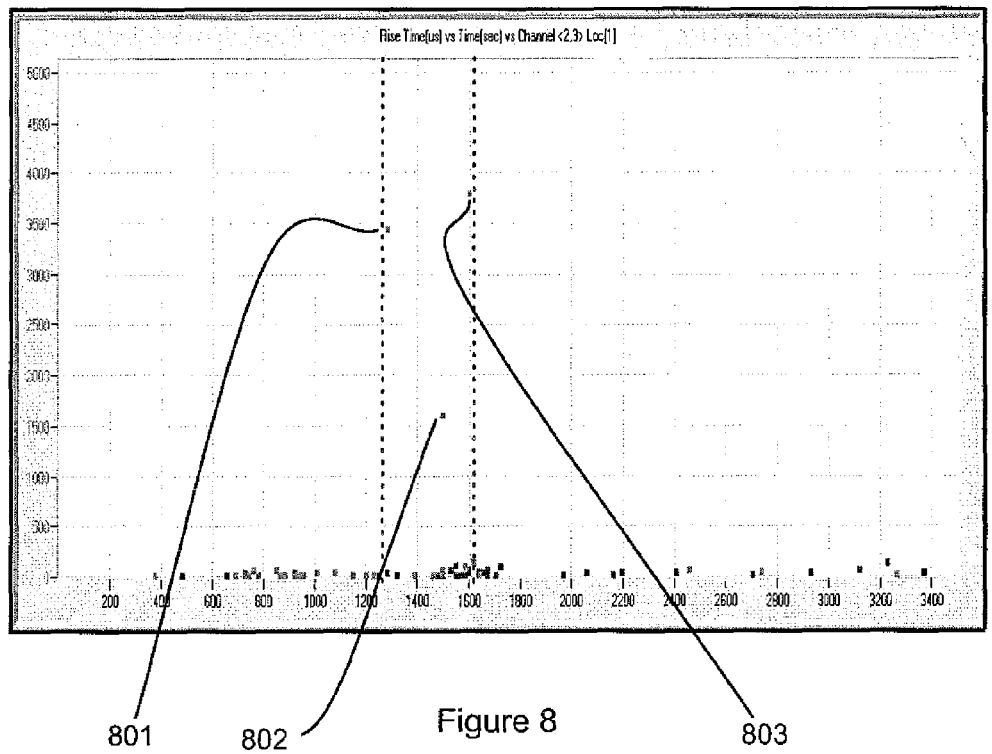
FIG. 8 is graph illustrating acoustic emission data input to the processing of FIG. 7.
FIG. 9 is a table illustrating a parameter value for an acoustic emissions determined by the processing of FIG. 7 from acoustic emission data produced by the reference structure in the yield test of FIG. 4 for use in the yield detection system of FIG. 2.

FIG. 8 shows one of the parameter values, in the form of the AE pulse rise time, for the strain test described above with reference to FIG. 4. The yield period is delineated by the dotted lines at 1289 s and 1596 s. As will be understood by those skilled in the art, there will be some discrepancy between the timings of events detected by an AE detection system and the timings for the event detected strain gauge (SG) timing system. In the present embodiment, there is an initial offset of approximately 250 seconds from the AE detection to the subsequent yield event being detected by the SG system. In other words, the AE system indicates dislocations and damage earlier than the SG system. The amount of time between AE detection and SG detection is not linear, but varies with stress. Therefore, the difference between the first detection, at 1289 s (AE) and at 1489 (SG) is 193 sec and the second detection, at 1596 s (AE) and 1807 s (SG) is 211 sec.

The graph of FIG. 8 shows the majority of AE pulses have relatively low rise times of up to 150 μs. However, three AE pulses 801, 802, 803 have significantly higher respective rise times of 3400 μs, 1600 μs and 3800 μs. Each of these AE pulses 801, 802, 803 occur within the yield period, with the highest rise times substantially coincident with the start and the end of the yield period. In the present embodiment, a parameter value is determined to be significantly different if it varies by a factor of >20 from the median parameter value. Thus in the example of FIG. 8, the significantly different parameter values are of AE pulse rise times in the range of 3400-3800 μs. Thus, with reference to FIG. 9, the yield signature 211 derived from the tested reference structure 401 for use with the corresponding operational structure 107 determines that if one or more AEs are detected from the operational structure, in the form of the landing gear 107, having rise times of between 3400-3800 μs then this indicates that yield has occurred in the landing gear 107 with the consequent probable need for replacement.

In another embodiment, the yield detection system 210 is not provided on-board the aircraft and the AE data is collected by the AE monitoring system and stored. The AE data is then retrieved from the AE monitoring system for separate analysis by an off-board yield detection system.

In a further embodiment, the AE sensors are placed non-selectively over part or substantially all of the operational structure to be monitored. In other words the positions of the AE sensors are not specifically determined based on the areas of the operational structure most likely to undergo yield. The AE sensors may be positioned randomly or in an organized pattern such as a grid.

In another embodiment, the yield signature is derived indirectly from experimental data for a given material either solely or in combination with specific yield test data.

In a further embodiment the yield signature comprises two or more parameter value ranges indicative of an AE produced in a yield period. In order for a given AE to be treated as indicative of yield, it must have parameter values within all of the yield signature parameter ranges. Thus, in this embodiment, the yield signature may be augmented with one or more further suitable parameter ranges for the AE pulse amplitude and AE pulse duration.

In the yield test described above that produced the yield signature of FIG. 9, two further significantly different parameter values were also detected in the yield period. In addition to AEs with high rise times, AE pulses with high amplitude (>60 dB) and an AE pulse duration of >10000 μs were also detected. In addition, the Burst Duration parameter also changes significantly in response to yield and this provides an indication of yield having occurred and therefore may be included in a yield signature.

In another embodiment, the level of a parameter, such as rise time, is compared as a percentage to the mean rise time of a predetermined preceding period. Significant changes in response to yield also provide an indication of yield having occurred and therefore may be included in a yield signature.

In a further embodiment, for a given AE to be treated as indicative of yield, it must have parameter values within one or more of the yield signature parameter ranges. In a further embodiment, for a given AE to be treated as indicative of yield, it must have parameter values within a predetermined threshold number of the yield signature parameter ranges. In another embodiment, the yield signature comprises a primary parameter range and one or more secondary parameter ranges. In order for a given AE to be treated as indicative of yield, it must have parameter values within the primary parameter range and a predetermined number within the second parameter ranges. In a further embodiment, instead of a Boolean yield indication, a probability measurement provided determined by a number of parameter ranges in the yield signature. For example, if a given AE meets four out of five parameter ranges the yield indication has an 80% probability of being correct. One or more parameter ranges within a yield signature may be weighted in their contribution to the final yield indication probability.

In another embodiment, parameter values from a plurality of AEs may be taken together to satisfy a given yield signature defining a plurality of parameter ranges. For example, a yield signature defining two parameters ranges A and B may be satisfied by the combination of a first AE with a parameter within range A and a second AE with another parameter within range B. In a further embodiment, a yield signature is provided with a plurality of parameter ranges, only one of which requires to be satisfied by an AE to be indicative of yield.

As will be understood by those skilled in the art, the sensors may be positioned in any set of locations suitable for the structure being monitored. For example, a set of two or three sensors may be positioned to detect vertical loads (Fz), a further set to detect lateral loads (Fy) and a further set to detect longitudinal loads (Fx). The positioning of the sets of sensors is based on a structural analysis of the structure being monitored to determine the weakest section for each axis direction, that is, the section, in each axis, most likely to yield when the structure is overloaded.

As will be understood by those in the art, the system for detecting yield described above may be applied to any mechanical structure in any suitable fields such as civil or transport engineering, for example, shipping, spacecraft, automotive applications and so on.

As will be understood by those in the art, the detection of yield by the yield detection system may, depending on the operational structure being monitored, require inspection or repair of the structure as opposed to replacement of the whole or a part of the structure.

As will be understood by those skilled in the art, yield is commonly defined as plastic deformation of a material resulting from the material having passed its elastic deformation limit.

As will be understood by those skilled in the art embodiment of the invention as described above may be implemented in combination with a system for determining the position of a given AEs using known triangulation techniques utilising characteristics of multiple signals received at a group of suitable sensors.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for detecting yield in a mechanical structure using acoustic emission data from said structure, said method comprising the steps of:
   determining a range of acoustic emission (AE) pulse rise time values indicative of an acoustic emission coincident with mechanical yield;
   receiving data representing one or more AEs detected in said mechanical structure;
   extracting rise time values for said received AEs;
   determining whether each extracted AE rise time value is within said determined range of rise time values; and
   indicating that yield has been detected in said mechanical structure if one or more of said rise time values is within said range of rise time values.

2. A method according to claim 1 in which said indicating is performed only when a predetermined threshold number of said extracted AE rise time values are within said range.

3. A method according to claim 1 in which said determined range is determined in dependence on the material from which said mechanical structure is formed.

4. A method for determining said range of AE pulse rise time values for use in the method of claim 1, comprising the steps of:
   performing a yield test on said reference structure;
   identifying a yield period for said reference structure;
   detecting acoustic emissions emitted from said reference structure during said yield test;
   comparing the AE pulse rise time values of said acoustic emissions detected in said yield period to said acoustic emission received outside of said yield period;
   identifying any of said AE pulse rise time values having a significant variance between said yield period and outside said yield period; and
   determining said range of AE pulse rise time values, as indicative of an acoustic emission coincident with mechanical yield in a reference structure, based on said identified variance.

5. A method according to claim 1 in which said acoustic emissions are received from an acoustic emissions monitoring system.

6. A method according to claim 1 in which said indicating that yield has been detected is provided to a fault monitoring system for said operational structure.

7. A method according to claim 1 in which said mechanical structure is a landing gear element in an aircraft.

8. A computer program product stored on a non-transitory computer readable storage medium comprising software code portions for performing, when said product is run on a computer, the method as claimed in claim 1.

9. A method for detecting yield according to claim 1, wherein said detecting step determines an AE pulse rise time value indicative of an AE coincident with mechanical yield in a reference structure.

10. A method according to claim 8 in which said mechanical structure is substantially formed from the same material as said reference structure.

11. Apparatus for detecting yield in a mechanical structure by means of acoustic emission data from said structure, said apparatus comprising:
   means for storing a range of acoustic emission (AE) pulse rise time values indicative of an AE coincident with yield;
   means for receiving data representing one or more AEs detected in said mechanical structure;
   means for extracting rise time values for said received AEs;
   means for determining whether each extracted AE value is within said stored range; and
   means for indicating that yield has been detected if one or more of said extracted AE rise time values is within said range of rise time values.

12. Apparatus according to claim 11 in which said indicating is performed only when a predetermined threshold number of said extracted AE rise time values are within said range.

13. Apparatus according to claim 11 in which said determined range is determined in dependence on the material from which said mechanical structure is formed.

14. Apparatus for determining said range of AE pulse rise time values for use by the apparatus in claim 11 comprising:
   means for performing a yield test on a reference structure;
   means for identifying a yield period for said reference structure;
   means for detecting acoustic emissions emitted from said reference structure during said yield test;

means for comparing AE rise time values detected in said yield period to said acoustic emission received outside of said yield period;

means for identifying any of said AE pulse rise time values having a significant variance between said yield period and outside said yield period; and means for determining said range of AE pulse rise time values, as indicative of an acoustic emission coincident with mechanical yield in a reference structure, based on said identified variance.

15. Apparatus according to claim 11 in which said acoustic emissions are received from an acoustic emissions monitoring system.

16. Apparatus according to claim 11 in which said means for indicating that yield has been detected is provided to a fault monitoring system for said mechanical structure.

17. Apparatus according to claim 11 in which said mechanical structure is a landing gear element in an aircraft.

18. An apparatus for detecting yield according to claim 11, wherein said means for storing stores an AE pulse rise time value indicative of an AE coincident with mechanical yield in a reference structure.

19. Apparatus according to claim 18 in which said mechanical structure is substantially formed from the same material as said reference structure.

20. Apparatus for detecting yield in a mechanical structure using acoustic emission (AE) data from said structure, the apparatus comprising:

a store of a range of AE pulse rise-time values indicative of yield;

AE sensors on said structure to extract and output AE data representing one or more AEs detected in the structure; and a processor configured to determining the AE pulse rise-time value for each output AE data and to identify whether or not any of the determined AE pulse rise-time values fall within the stored range AE pulse rise-time values and to indicate that yield has been detected in the mechanical structure if a AE pulse rise-time value falls within the stored range of acoustic emission pulse rise-time values.

21. An apparatus for detecting yield according to claim 20, wherein said store stores an AE pulse rise time value indicative of an AE coincident with mechanical yield in a reference structure.

22. An apparatus for detecting yield according to claim 21, wherein said reference structure and said mechanical structure are substantially the same material.

* * * * *